(12) United States Patent
Stein et al.

(10) Patent No.: US 7,963,275 B2
(45) Date of Patent: Jun. 21, 2011

(54) SYSTEM AND METHOD FOR IMPROVING EXHAUST GAS RECIRCULATION FOR A TURBOCHARGED ENGINE

(75) Inventors: Robert Albert Stein, Saline, MI (US);
Daniel Joseph Styles, Canton, MI (US);
Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 12/169,681

(22) Filed: Jul. 9, 2008

(65) Prior Publication Data

US 2010/0010728 A1  Jan. 14, 2010

(51) Int. Cl.
*F02B 47/08* (2006.01)
(52) U.S. Cl. ............. 123/568.2; 123/568.21; 123/559.1; 60/605.2

(58) Field of Classification Search ............. 123/568.11, 123/568.17, 568.18, 568.21, 559.1, 568.16, 123/568.2; 60/605.2, 605.1; 701/108, 110
See application file for complete search history.

(56) References Cited

U.S. PATENT DOCUMENTS

| | | | |
|---|---|---|---|
| 6,301,884 B1 | 10/2001 | Hauser et al. | |
| 6,945,236 B2 | 9/2005 | Nakai et al. | |
| 6,973,786 B1 | 12/2005 | Liu et al. | |
| 7,043,914 B2 | 5/2006 | Ishikawa | |
| 7,168,250 B2 | 1/2007 | Wei et al. | |
| 2009/0249783 A1* | 10/2009 | Gokhale et al. | 60/602 |

* cited by examiner

*Primary Examiner* — Hai H Huynh
(74) *Attorney, Agent, or Firm* — Allan J. Lippa; Alleman Hall McCoy Russell & Tuttle LLP

(57) ABSTRACT

A system and method for delivering EGR to an internal combustion engine is presented. The system can reduce system cost and lower system complexity.

26 Claims, 4 Drawing Sheets

SYSTEM AND METHOD FOR IMPROVING EXHAUST GAS RECIRCULATION FOR A TURBOCHARGED ENGINE

FIELD

The present description relates to improving exhaust gas recirculation for an internal combustion engine.

BACKGROUND

A system and method for controlling exhaust gas recirculation (EGR) of an internal combustion engine is described in U.S. Pat. No. 7,043,914. The patent describes an EGR system that has a high pressure loop and a low pressure loop. The system uses two separate EGR valves and two separate EGR coolers to provide exhaust gases from upstream a turbocharger turbine to a location downstream the turbocharger compressor or to a location upstream the turbocharger compressor. The system also includes a particulate filter to protect the turbocharger compressor from engine soot. The system purportedly allows large amounts of EGR when the engine is operated at high engine speed and high engine load, thereby reducing engine NOx.

The above-mentioned system can also have several disadvantages. Namely, the system requires control of two different EGR valves. Controlling two different EGR valve may be difficult because the two valves may have different flow characteristics due to deposits and manufacturing tolerances. As a result, EGR rate and engine torque may vary or be unstable when both valves are simultaneously controlled as the engine control system may not have sufficient information to determine which valve to adjust. In addition, switching EGR delivered upstream the compressor to downstream the compressor can cause EGR flow variation in one EGR valve when the other EGR valve is opened or closed. Further, the system requires two EGR coolers. Further still, the system enables EGR flow through the compressor simply in response to a temperature sensor and will only allow EGR flow in that path if the temperatures are high enough to regenerate the particulate filter. As a result, the engine may operate for a period of time when little EGR flows to the engine because the desired EGR flow rate can only be generated in the pre-turbine to pre-compressor path; however, low exhaust temperatures will cause flow to be inhibited.

The inventors herein have recognized the above-mentioned disadvantages and have developed a system and method that offers substantial improvements.

SUMMARY

One embodiment of the present description includes a system for providing EGR to an internal combustion engine, the system comprising: an internal combustion engine; a turbocharger comprising a compressor and a turbine; an EGR valve capable of directing exhaust gases from the engine's exhaust to a location in the engine's intake system upstream of the compressor or to a location in the engine's intake system downstream of the compressor; and a controller that provides compensation when the state of the EGR valve changes from a condition supplying exhaust gases to downstream the compressor to supplying exhaust gases to upstream the compressor. This system overcomes at least some disadvantages of the above-mentioned system.

Supplying EGR to a turbocharged engine can be improved by using a single EGR valve in place of two separate independently controlled EGR valves. An EGR valve that has multiple flow paths eliminates the need for having to simultaneously control two valves and multiple EGR coolers. Further, since a single multiple flow path valve flows in only one direction at a time, it is simple to determine when exhaust gas flow to one EGR path ceases and when exhaust flow to a different EGR path begins. As such, compensation can be supplied to reduce engine torque fluctuation and engine NOx. Similarly, engine air-fuel ratio control may be improved because transitions between EGR paths may be more repeatable.

The present description can provide several advantages. Namely, the present system can reduce system complexity and cost. Further, the present system may reduce engine air-fuel excursions when the engine EGR flow path is changed. Further still, the present system may improve system reliability because it has fewer components than other systems.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
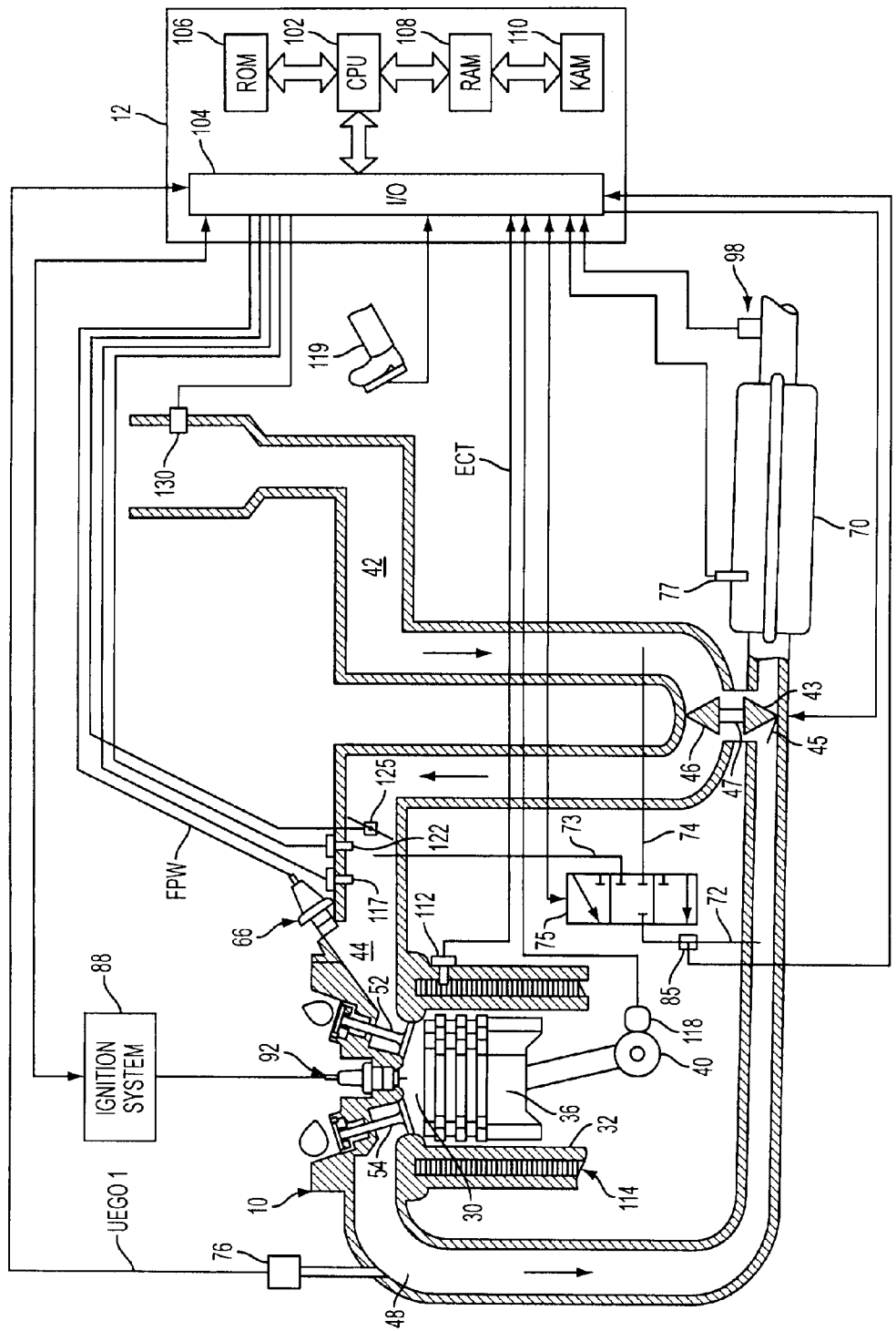
FIG. 1 is a schematic diagram of an example engine having a turbo-charger and its control system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is mechanically operated and valve opening and closing times are variable with respect to crankshaft position. Alternatively, the intake and/or exhaust valves may be electrically or hydraulically actuated.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Turbo charger 47 is shown in communication with exhaust manifold 48 and intake manifold 44. Fresh air may be compressed by turbo charger compressor 46, delivered to throttle body 125, and directed to intake manifold 44. Alternatively, throttle body 125 may be located upstream of turbo charger compressor 46. If the throttle body is located upstream of the compressor, pressure and temperature transducers may be installed in the intake manifold as well as between the compressor and the throttle (i.e., boost pressure and temperature).

Turbo charger turbine 43 is connected to turbo charger compressor 46 by a shaft. During operation exhaust gases can flow from exhaust manifold 48 to turbo charger 47, where expanding exhaust gases can rotate exhaust turbine 43 and compressor 46. Exhaust gases are directed from turbine 43 to catalyst 70 for processing. Turbo charger efficiency may be adjusted by varying the vane position actuator 45 of the variable geometry turbo charger. Alternatively, the turbo charger may be a waste gate type of turbo charger. Also, note that a supercharger may replace the turbocharger if desired.

EGR valve 75 directs exhaust gases from exhaust manifold 48 to the engine's intake system downstream of compressor 46 or to the engine's intake system upstream of compressor 46. Duct 72 directs exhaust gases from the exhaust system to EGR valve 75. If desired, an exhaust gas cooler and/or catalyst (e.g., three-way or oxidation catalyst) may be located along duct 72 between exhaust manifold (which may include exhaust piping or ducting) and EGR valve 75. Duct 73 connects one outlet of EGR valve 75 to the engine's intake system downstream of compressor 46 and throttle 125. Duct 74 connects a second outlet of EGR valve 75 to the engine's intake system upstream of compressor 46. In an alternative embodiment, an exhaust gas cooler and/or catalyst may be located along duct 74 and in between EGR valve 75 and intake duct 42. In still another embodiment, an exhaust gas cooler may be located in duct 73.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to an accelerator pedal; a measurement of engine air mass from mass air sensor 130; EGR valve position from sensor (not shown); exhaust delta pressure across an orifice from sensor 85; a measurement of engine manifold pressure (MAP) from pressure sensor 122 coupled to intake manifold 44; a measurement (ACT) of engine air temperature or manifold temperature from temperature sensor 117; and engine position from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined. The controller may determine the amount of overlap between intake and exhaust valves as well as fuel timing, spark timing, and throttle position.

Storage medium read-only memory 106 can be programmed with computer readable data representing instructions executable by processor 102 for performing the methods described below as well as other variants that are anticipated but not specifically listed.

Figure 2:
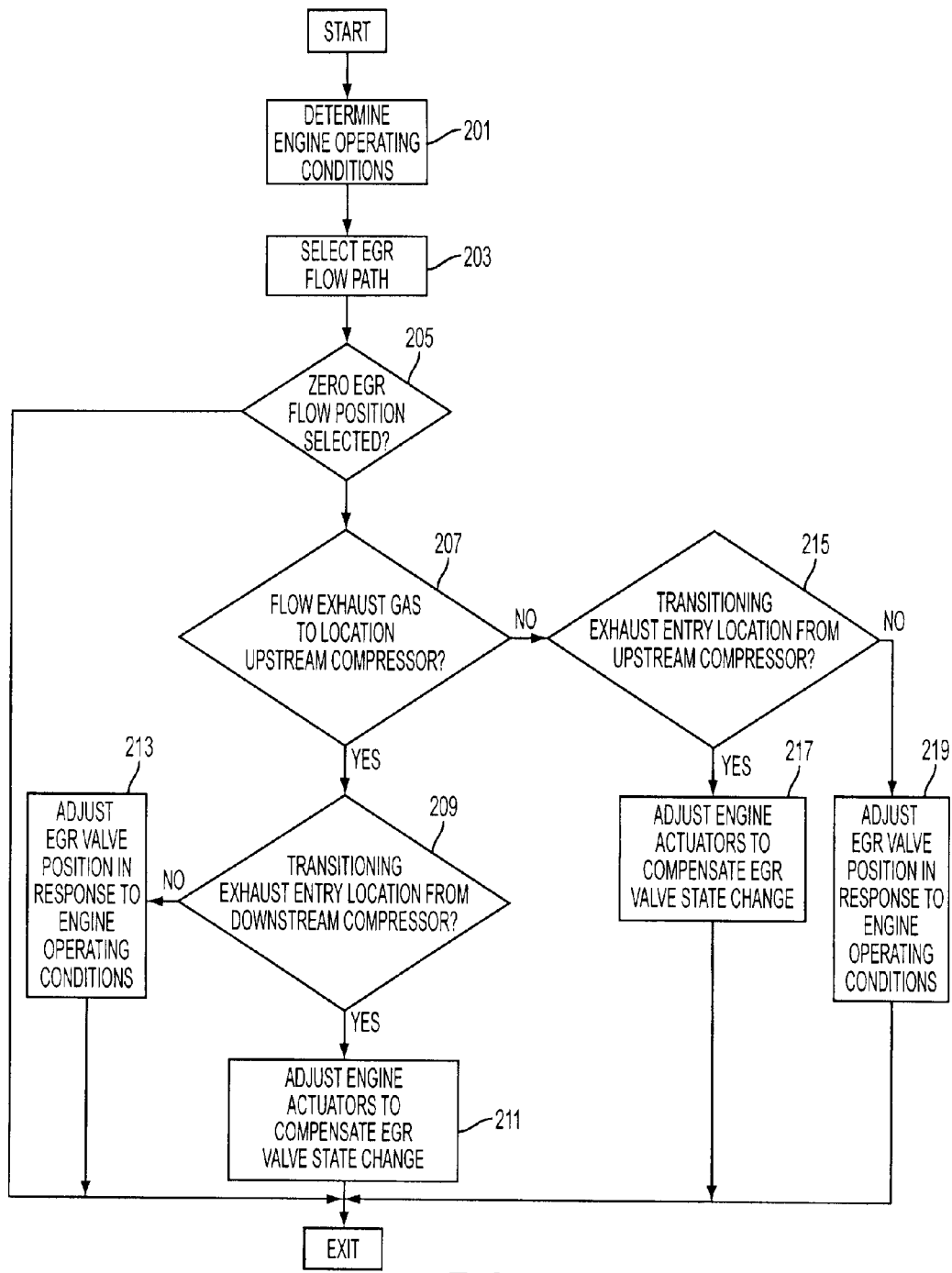
FIG. 2 is a flowchart of an example method for improving EGR for a turbocharged internal combustion engine.

Referring now to FIG. 2, a flow chart of an example routine for controlling EGR to a turbocharged engine is presented. At step 201, engine operating conditions are determined. In one embodiment, engine coolant temperature, time since start, ambient temperature, engine torque demand, engine speed, EGR valve position, and intake manifold pressure are determined from sensor data input to an engine controller or from data that characterizes actuator performance, see FIG. 1 engine controller 12 for example. However, additional or fewer operating conditions may be determined if desired. After engine operating conditions are determined the routine proceeds to step 203.

Referring now to step 203, the routine selects the desired EGR flow path in response to engine operating conditions. The EGR valve may inhibit exhaust gas flow or it may be used to regulate the amount of EGR flowing in a first path or in a second path, but EGR flow may only be regulated in the first or second path at one time. That is, EGR flow is stopped in the first path when there is EGR flow in the second path and vice-versa.

In one embodiment, the EGR flow path is determined in response to engine speed and requested engine torque demand. If engine speed and torque are within a particular operating region, exhaust gas is extracted from the vehicle's exhaust manifold or pipe from a location in the exhaust system and delivered to a location in the engine's intake system downstream from the compressor. For example, at medium engine speeds (e.g., engine speed that may be near 2500 RPM, 3000 RPM, 3500 RPM, 4000 RPM, 4500 RPM), exhaust gases can be directed from the exhaust manifold/pipe to a location in the intake system downstream from the compressor. Further, exhaust gases can be directed from the exhaust manifold/pipe to a location in the intake system downstream from the compressor when engine speed is low (e.g., engine speed that may be near 800 RPM, 900 RPM, 1000 RPM, 1200 RPM, 1500 RPM, 2000 RPM, 2500 RPM) and at low to medium engine torque requests (e.g., engine torque request that may be near 10%, 15%, 20%, 25%, 30%, 35% of full scale engine output torque).

Figure 3B:
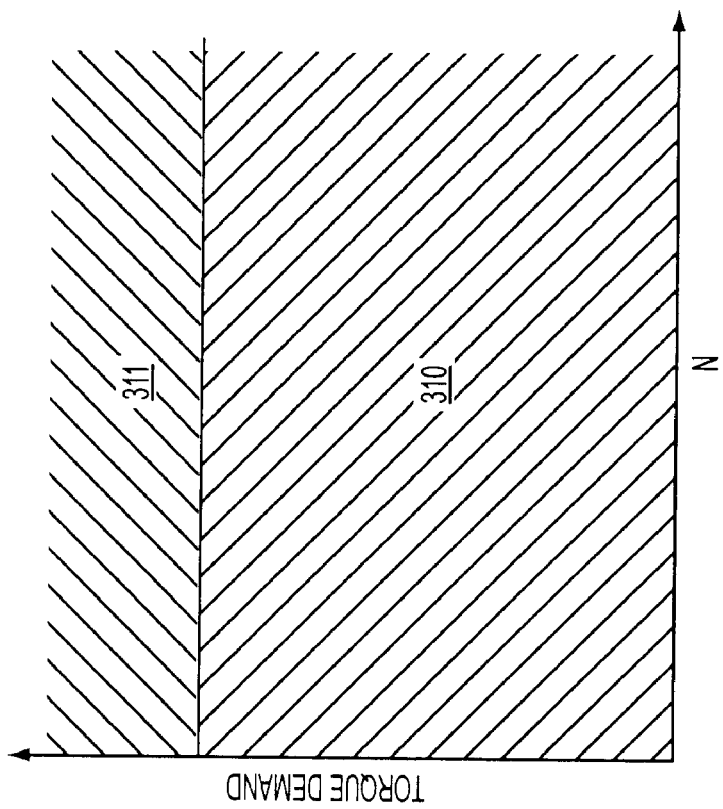
FIG. 3B is an alternate engine map describing an example of different EGR flow modes.
Figure 3A:
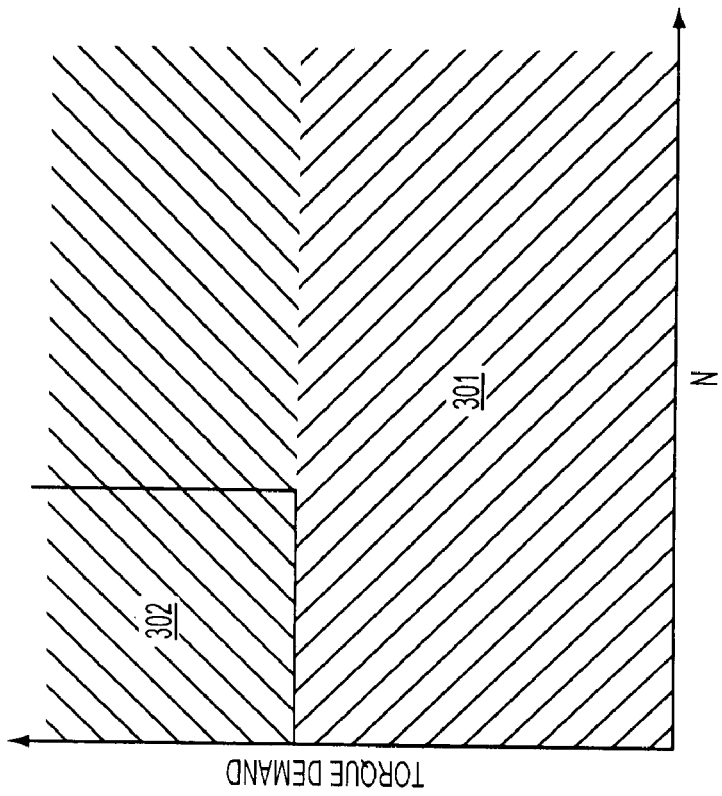
FIG. 3A is an engine map describing one example of different EGR flow modes.

On the other hand, if engine speed and torque are within a second different operating region, EGR is extracted from the vehicle's exhaust manifold or pipe and delivered to a location in the engine's intake system upstream from the engine's compressor. For example, at low engine speeds and high engine torque requests (e.g., engine torque request that may be near 40%, 50%, 60%, 75%, 80%, 95%, 100% of full scale engine output torque) exhaust gases can be directed from the exhaust manifold/pipe to a location in the intake system upstream from the compressor. FIGS. 3a and 3b provide examples of two anticipated EGR flow path determination maps that may be used to determine EGR valve state.

In an alternate embodiment, the EGR flow path can be determined in response to a sensed differential pressure between pressure in the exhaust manifold/pipe and the pressure in the intake system. For example, if the EGR valve is directing exhaust gases to a location in the intake system downstream from the compressor and the pressure ratio between the exhaust manifold/pipe and the intake manifold downstream the compressor is less than a predetermined amount or threshold, the routine decides to change the EGR valve state. Specifically, the EGR valve state is adjusted so that exhaust gases are directed from the exhaust manifold/pipe to a location in the intake system that is upstream the compressor.

On the other hand, if the EGR valve is positioned to deliver exhaust gases upstream the compressor and the pressure difference between the exhaust manifold/pipe and the intake manifold downstream the compressor is greater than a predetermined amount, then the EGR valve can be repositioned so that exhaust gas is directed from the exhaust manifold/pipe to a location in the intake system located downstream from the compressor.

In yet another embodiment, engine speed, engine torque request, and differential pressure between the exhaust manifold/pipe and engine intake system are used to determine the EGR valve position. Specifically, the engine speed and requested torque are used to index a table or function that describes a particular EGR flow path, if the pressure differential between the exhaust manifold/pipe and the intake system is within a prescribed range, then the EGR valve state changes. If the pressure differential is not within the prescribed range, then the EGR valve state is held constant. In this way, the EGR valve state is confirmed based on engine torque request and differential pressure between the exhaust system and the intake system. The routine proceeds to step 205.

In one embodiment, at lower engine speed and torque demands, exhaust gas is directed from the exhaust manifold/pipe to a location in the intake system that is downstream from compressor. As the requested engine torque increases, the EGR valve position changes state based on the decision in step 203. After the EGR valve changes to its new state, exhaust gases are directed from the exhaust manifold/pipe to a location in the intake system upstream from the compressor.

At step 205, the routine determines if zero EGR flow is desired. If EGR is to be deactivated the routine sets the EGR valve to the closed position and exits. Otherwise, the routine proceeds to step 207.

At step 207, the routine determines whether to execute steps to flow exhaust gas to an intake system location that is downstream from the compressor or to execute steps to flow exhaust gas to an intake system location upstream from the compressor. If at step 203 the routine determined to flow exhaust gas to a location in the intake system downstream the turbocharger compressor, then the routine proceeds to step 215. Otherwise, the routine proceeds to step 209.

At step 209, the routine determines if a change to the EGR valve state is being requested. That is, the routine determines if the EGR valve is being repositioned to direct exhaust gases from entering the intake system from downstream the compressor to directing exhaust gases to entering the intake system from upstream the compressor.

Note that repositioning the EGR valve to increase or decrease exhaust flow to an individual EGR flow path does not constitute an EGR state change for the purpose of identifying EGR valve state changes. Rather, an EGR valve state change occurs when the EGR valve position is changed, and as a result, the direction of exhaust gas flow changes from one flow path to a different flow path (e.g., changing the exhaust gas introduction location in the intake system from upstream the compressor to a location downstream from the compressor. If an EGR valve state change is in progress, the routine proceeds to step 211. If not, the routine proceeds to step 213.

At step 211, the routine adjusts various actuators to compensate the EGR valve state change. In one embodiment, the engine throttle, EGR valve position, and spark advance are used to compensate a change in the EGR valve state. The throttle and spark adjustments are used to compensate torque changes that may occur when the direction of exhaust gas flow is changed from a first flow path to a second flow path. The EGR valve position is adjusted after the EGR valve changes state to account for the portion of intake system volume that has an exhaust gas fraction that is different from the desired exhaust gas fraction.

When the EGR valve state is changed to send exhaust gas to a location upstream the compressor, exhaust gases are directed from the exhaust manifold/pipe to a location in the intake system upstream from the compressor. Initially after the EGR valve changes state, the EGR valve is opened to a position that exceeds the position at which the exhaust gas flow rate through the EGR valve provides the desired level of EGR at substantially equivalent steady state engine and EGR valve operating conditions. The EGR valve is then closed to a position that delivers the desired level of EGR at the present engine operating conditions. Thus, the EGR valve opens to a first position and then closes to a second position that is less open than the first position. Engine charge mixture is improved during an EGR valve state change by overshooting the desired steady state EGR valve position and then moving toward the desired steady state EGR valve position.

Providing EGR valve position overshoot during an EGR valve state change increases the flow of exhaust gas into the intake manifold upstream from the compressor. Consequently, exhaust flow into the volume of air in the intake system that exists between the upstream and downstream EGR injection points is increased. As a result, the newly mixed air and exhaust gas enters the intake manifold at a level that is closer to the mixture that existed in the intake manifold before the EGR valve changed state.

When exhaust gas delivery to the intake system is switched from a location downstream from the compressor to a location that is upstream from the compressor, the throttle plate position may also be adjusted by briefly decreasing the throttle opening amount. Decreasing the throttle opening amount allows substantially the same air charge to be drawn into engine cylinders after the EGR valve state change as before the EGR valve state change. If the throttle position were to remain at substantially the same position during the EGR valve state change, then additional air may enter the engine because of the manifold pressure drop that may be created by deactivating EGR flow. The change in throttle position can be looked up from empirically determined tables that output throttle position as a function of time since EGR valve state transition, engine torque demand, and engine speed. Alternatively, throttle position can be determined from a model that describes manifold filling such as that which is described in U.S. patent application Ser. No. 11/293,729 which is hereby fully incorporated by reference.

Cylinder spark advance can also be adjusted during an EGR valve state transition when the exhaust delivery location in the intake system is changed from a location downstream from the compressor to a location upstream of the compressor. During the EGR valve state transition the crankshaft angle at which spark is delivered to a cylinder can be retarded to control the engine torque during the valve transition. This provides engine torque compensation when the amount of exhaust entering engine cylinders may briefly change. Retarding the spark lowers engine torque and peak cylinder pressure, thereby controlling engine NOx formation during the EGR valve state change. The amount of spark retard and the spark retard duration may be empirically determined and captured in tables or functions that are interpreted during an EGR valve state transition. The tables can be indexed by engine operating conditions so that different amounts and durations of spark retard can be implemented for different engine operating conditions.

In other embodiments, additional or fewer actuators may be used to control engine torque and emissions during EGR valve state transitions. For example, valve timing may be adjusted by moving camshaft timing with respect to crankshaft timing. However, it is recognized that some adjustable valve timing devices may operate on a longer time scale than throttle or spark adjustments. Variable valve timing may be used to adjust engine torque and internal EGR (i.e., in-cylinder EGR) in systems that have large intake manifolds. In one example, intake valve timing and exhaust valve timing are retarded when the entry location of exhaust entering the intake system moves from a location downstream of the compressor to a location that is upstream from the compressor. Further, exhaust valve timing and intake valve timing may be advanced when the entry location of exhaust entering the intake system is moved from a location upstream the compressor to a location downstream from the compressor.

Turbocharger efficiency may also be adjusted during an EGR valve state transition. For example, when the EGR valve is switched from delivering exhaust gas from a location in the intake system downstream from the throttle body and compressor to a location upstream the throttle body and compressor, the turbocharger efficiency can be temporarily reduced. Lowering the turbocharger efficiency lowers the possibility that cylinder air charge will increase when EGR flow to the intake system is temporarily suspended.

Fuel injection timing may also be changed during an EGR valve state transition. In one example, fuel injection timing may move from injecting fuel while the intake valve is closed to a time when the intake valve is open. After the engine actuators are adjusted to compensate for the EGR valve state transition the routine exits.

If the routine proceeded to step 213 from step 209, the routine determines the amount of adjustment to apply to the EGR valve in response to present engine operating conditions determined in step 201. In one embodiment, an amount of EGR is looked up from empirical data stored in a table. The table output is a mass flow rate of EGR going into the intake system at the present engine speed and torque demand, for example. The EGR valve is moved to a mapped position that is looked up in response to engine speed and engine torque demand. The routine then determines the pressure drop across an orifice to determine the actual flow through the EGR path. The EGR valve position is then adjusted in response to the difference between the desired EGR flow rate and the actual EGR flow rate. After the EGR position is adjusted the routine exits.

If the routine proceeded to step 215 from step 207, the routine determines if an EGR valve state transition is in progress. If a state transition is in progress, the routine proceeds to step 217. If not, the routine proceeds to step 219.

At step 217, the EGR valve state is in the process of changing from a condition where exhaust gas is delivered from a location upstream the compressor and throttle body to a location downstream the compressor and throttle body, and the EGR valve can be positioned briefly in the closed state or in a position at which less exhaust gas is delivered to the intake system than when the engine is operating at substantially similar conditions. Briefly stopping or reducing the flow of exhaust gas from the exhaust manifold/pipe during a condition where the state of the EGR valve is changed from delivering exhaust gas from upstream the compressor to a location downstream the compressor allows time for additional air to enter the intake system near the new EGR flow entry point. The additional air can then be combined with EGR at the downstream EGR introduction location so that the air and exhaust gas entering the cylinder is substantially the same as before the EGR valve state transition. If the same amount of exhaust were to flow to the downstream EGR introduction location at the time that the EGR valve state changed, then the level of exhaust gas entering the cylinder would temporarily increase potentially resulting in less engine torque and an air-fuel ratio deviation.

When exhaust gas delivery to the intake system is switched from a location upstream the throttle body and compressor to a location downstream the throttle body and compressor, the throttle plate position may also adjusted by briefly increasing the throttle opening amount. Increasing the throttle opening amount allows substantially the same air charge to be drawn into engine cylinders after the EGR valve state change as before the EGR valve state change. If the throttle position were to remain at substantially the same position during the EGR valve state change, then less air may enter the engine because of the manifold pressure increase that may be created by activating EGR flow downstream from the throttle. As previously described, the change in throttle position can be looked up from empirically determined tables or from models.

Cylinder spark advance can also be adjusted during an EGR valve state transition when the exhaust delivery location in the intake system is changed from a location upstream the compressor and throttle body to a location downstream the throttle body and compressor. During the EGR valve state transition the crankshaft angle at which spark is delivered to a cylinder can be advanced or maintained to control the engine torque during the valve transition when the amount of exhaust entering engine cylinders may briefly change. Advancing the spark can increase engine torque. The amount of spark advance and the spark advance duration may be empirically determined and captured in tables or functions that are interpreted during an EGR valve state transition. The tables can be indexed by engine operating conditions so that different amounts and durations of spark advance can be implemented for different engine operating conditions.

Turbocharger efficiency can be increased when the EGR valve state is changed from delivering exhaust gas from an intake system location that is upstream the throttle body and compressor to location that is downstream the throttle body and compressor. In this example, the turbocharger efficiency may be increased during the EGR valve state transition.

Referring now to step 219, the routine determines the amount of adjustment to apply to the EGR valve in response to present engine operating conditions determined in step 201. In one embodiment, an amount of EGR is looked up from empirical data stored in a table. The table output is a mass flow rate of EGR going into the intake system at the present engine speed and torque demand, for example. The EGR valve is moved to a mapped position that is looked up in response to engine speed and engine torque demand. The routine then determines the pressure drop across an orifice to determine the actual flow through the EGR path. The EGR valve position is then adjusted in response to the difference between the desired EGR flow rate and the actual EGR flow rate. After the EGR position is adjusted the routine exits.

Referring now to FIG. 3a, a plot of an engine EGR mode map that is described in relation to engine operating conditions is shown. The plot has an x-axis that represents engine operating speed, wherein engine speed increases from left to right. The y-axis represents desired or demanded engine torque. The amount of demanded engine torque increases from the plot's bottom to top. It should be noted that the available engine speed and torque demand will vary with engine application. As such, the illustrated plot is meant to describe EGR flow modes and not to limit the system and method to any particular engine.

The engine EGR mode map is shown having two separate regions, 301 and 302. When the engine operates in region 302, engine exhaust gases are directed to a location in the intake system upstream of a compressor. When the engine is operated in region 301, engine exhaust gases are directed to a location in the intake system downstream of the compressor.

Region 302 represents engine operating conditions where engine speed is low and engine load (Engine load is related to the theoretical amount of air a cylinder can hold at a given pressure; it is typically scaled from 0-1, where 1 represents that the cylinder contains the theoretical limit of air amount) or torque demand is high. The size and shape of region 302 may vary depending on engine design and configuration. In one embodiment, the region's boundaries are determined by operating the engine with EGR flowing to a location in the intake system downstream from the compressor. The boundary is made at engine conditions where EGR flow is limited to a value that is less than desired, or where the EGR flow varies more than a desired amount. Thus, when the operator requests that the engine move across the boundary between region 301 and region 302, the location at which EGR enters the intake system is moved from downstream the compressor to upstream the compressor.

By changing the location at which EGR enters the engine's intake system, engine emissions and fuel consumption may be reduced. For example, EGR can be delivered to the intake system at a location upstream a compressor when pressure in the intake manifold rises above pressure in the exhaust system. Thus, the benefits of EGR can be continued during engine operating conditions that may not otherwise permit the introduction of EGR to the engine.

Referring now to FIG. 3b, a plot of an alternative engine EGR mode map is shown. The x and y axes are similar to those described in FIG. 3a.

The engine EGR mode map is shown having two separate regions, 310 and 311. When the engine operates in region 311, engine exhaust gases are directed to a location in the intake system upstream of a compressor. When the engine is operated in region 310, engine exhaust gases are directed to a location in the intake system downstream of the compressor.

Region 311 represents engine operating conditions where engine load or torque demand is high. The torque demand at the boundary between region 310 and 311 may vary depending on engine design and construction. Boundary at region 311 includes high and low engine speeds where the engine is operated above a predetermined torque demand. When EGR is delivered according to the bounds of region 311, it is possible to flow EGR to the engine when intake manifold pressure is high. Thus, the amount of EGR delivered to the engine at high load can be increased as compared to a system that utilizes a single entry point to the engine's intake system.

Figure 4:
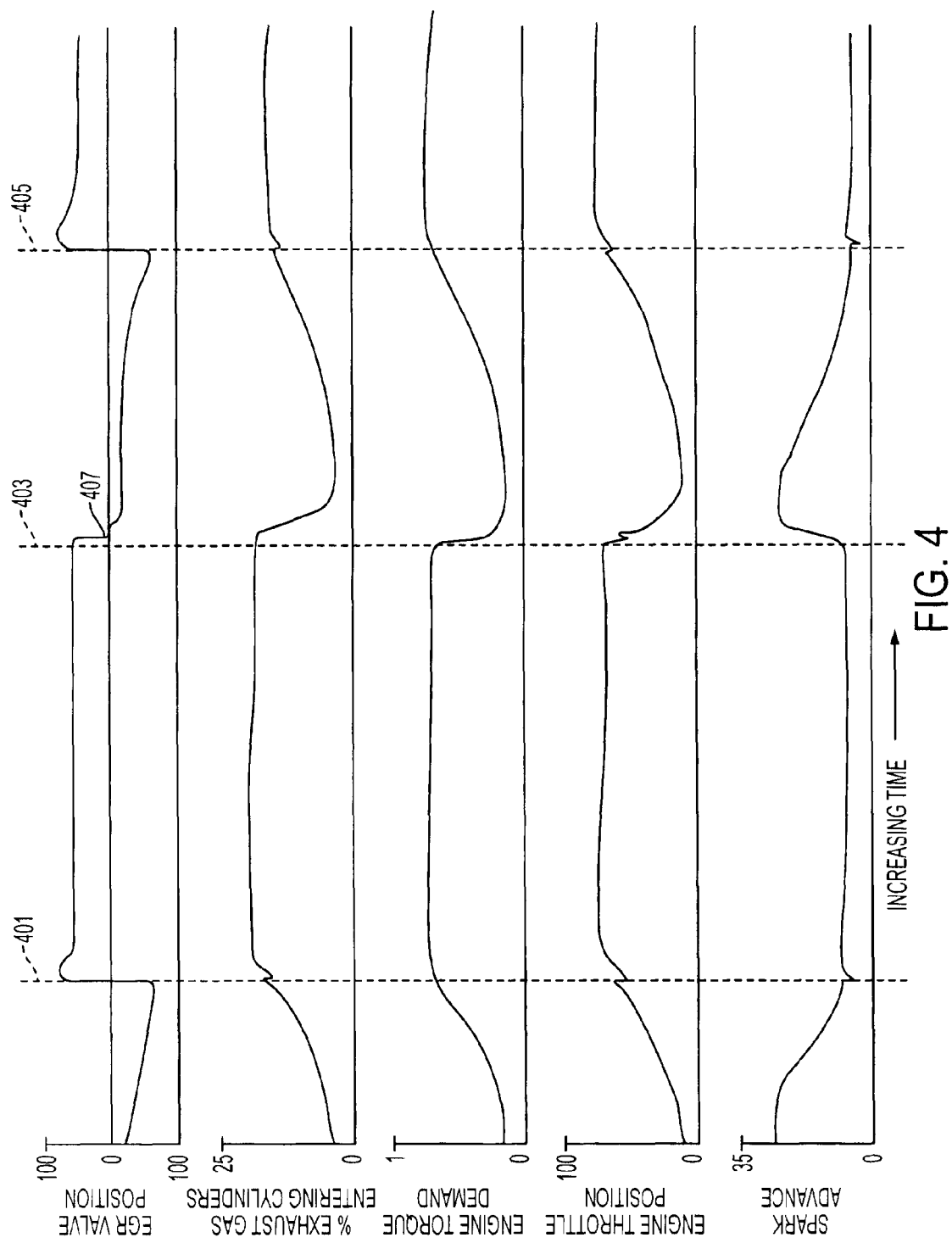
FIG. 4 is an example plot illustrating engine conditions during a simulated engine operating schedule.

Referring now to FIG. 4, a plot of signals of interest during an EGR valve state change is shown. The x-axis represents time for all subplots. Time begins at zero and increases from left to right. Beginning from the top and moving toward the bottom, the first subplot shows a simulated example of EGR valve position during an operating cycle of an engine. The zero corresponds to a valve position at which there is substantially zero exhaust gas recirculation flow. The bottom 100 label indicates the location where the EGR valve is fully open and where exhaust gases are directed to the intake system at a location downstream the compressor. The top 100 label indicates the location where the EGR valve is fully open and where exhaust gases are directed to the intake system at a location upstream the compressor. The next subplot illustrates EGR flow into the engine during the same time period. The following subplot illustrates engine torque demand (0 being zero torque demand and 1 being 100% torque demand) during the same period followed by spark advance and throttle position (0 being top-dead-center compressor stroke and 35 being advanced 35 crankshaft angle degrees from top-dead-center compression stroke).

At time zero, the EGR valve position is partially open for delivering exhaust gas to a location in the intake manifold that is downstream the compressor. The EGR valve position continues to open as vertical marker 401 is approached in time. The amount of exhaust gas entering the engine at time zero is low and increases as time approaches vertical marker 401. Similarly, the engine torque demand and throttle at time zero are low and increase as time approaches vertical marker 401. Spark is initially advanced and is retarded as engine load increases.

Vertical marker 401 represents a point in time at which the engine torque demand reaches a predetermined level. When the engine torque demand reaches the predetermined level, the EGR valve switches state. The EGR valve state change is identified by the EGR valve trajectory moving from below the zero position to above the zero position. Exhaust gas flowing into the intake system moves from an entry point downstream the compressor to a location upstream the compressor. Recognize that the EGR valve goes through a zero flow condition before exhaust begins to flow upstream the compressor. Consequently, exhaust gases temporarily stop flowing from the exhaust manifold/pipe to the intake system during the EGR valve state transition. When the EGR state position is changed, the EGR valve opening amount is made to purposefully overshoot the position that yields the desired exhaust flow rate at steady state conditions. By commanding the EGR valve to overshoot the desired exhaust gas steady state flow rate, additional exhaust gas can be introduced upstream the compressor. Introducing additional exhaust gas to the intake system allows more exhaust gas to mix with air that occupies intake duct volume between the upstream and downstream exhaust gas entry locations in the intake system.

The percent exhaust gas entering the cylinder increases as vertical marker 401 is approached. The increased exhaust flow corresponds to a larger EGR valve opening amount. Likewise, engine torque demand, and throttle position are shown increasing as time approaches vertical marker 401. The illustrated sequence represents a condition when the operator increases engine torque demand at low engine speed.

At vertical marker 401, the EGR valve changes state and compensation is provided by adjusting the throttle position and the spark advance. The throttle position is decreased and then is increased shortly thereafter. The throttle position is adjusted to compensate for the change in intake manifold pressure that may occur when the exhaust gas introduction location is changed. The throttle opening amount is adjusted to control engine torque during the EGR valve state change. By adjusting the throttle, air entering the cylinders is adjusted so that the torque output from the engine is near the desired engine torque.

The amount of exhaust gas entering the engine cylinders increases from time zero to the time at vertical marker 401. When the EGR valve state is transitioned, the amount of exhaust entering the cylinders is briefly reduced because exhaust gases entering the intake system from upstream the compressor cannot instantaneously mix with the air that occupies the intake system volume between the upstream and downstream exhaust gas entry locations.

Engine spark may also be adjusted during the EGR valve state change. Spark angle advance is shown decreasing at the time approaching vertical marker 401. As the EGR valve state is changed, spark is retarded. Retarding the spark provides a way to adjust engine torque when the EGR valve state is changed. As previously described, engine torque may increase as exhaust gas entering the intake system downstream the compressor is deactivated. Retarding the spark angle can be used to compensate an increase in cylinder air charge that may accompany an EGR valve state change.

Between vertical marker 401 and 403, the signals depicted in the subplots are adjusted in relation to engine operating conditions. The example in the figure represents engine operating conditions that remain substantially constant between vertical marker 401 and 403.

At vertical marker 403, the engine torque demand is decreased and the EGR valve state changes shortly thereafter. Intake manifold pressure is reduced when the engine torque demand is reduced, thereby facilitating exhaust gas flowing into the intake system at a location downstream from the compressor. During the EGR valve state change, the EGR valve may be briefly held at a closed position where exhaust flow through the valve is substantially zero, see label 407. The amount of time that the valve stays at the zero flow position may depend on engine operating conditions and the volume of the intake system between the upstream and downstream exhaust gas entry locations.

The amount of exhaust gas entering the cylinders does not instantaneously change when the EGR valve state changes. Exhaust gas continues to flow from the exhaust gas entry location upstream the compressor until the exhaust gas is inducted into the engine cylinder and fresh air displaces the exhaust gas. The amount of exhaust gas entering the engine cylinders is then reduced to a level that is related to the EGR valve position.

The engine throttle opening amount is reduced with engine torque demand. However, the throttle opening amount is briefly increased after vertical marker 403 and during the EGR valve state transition so that engine torque is smoothed. Opening the engine throttle allows fresh air to mix with the exhaust enriched charge mixture so that the amount of exhaust entering engine cylinders does not substantially increase. Opening the throttle can reduce the possibility of engine misfire when engine torque demand is reduced and when an EGR valve state change occurs.

Engine spark advance is increased as engine load decreases. Although not shown, it is possible to briefly advance or retard spark so that engine emissions or torque may be controlled.

Engine torque is gradually increased between vertical markers 403 and 405. At vertical marker 405 the requested engine torque reaches a predetermined level and the EGR valve state is changed so that exhaust gas can continue to flow into engine cylinders. Engine actuators are adjusted similarly as shown at vertical marker 403.

The methods, routines, and configurations disclosed herein are exemplary and should not be considered limiting because numerous variations are possible. For example, the above disclosure may be applied to I3, I4, I5, V6, V8, V10, and V12 engines operating in natural gas, gasoline, diesel, or alternative fuel configurations.

The following claims point out certain combinations regarded as novel and nonobvious. Certain claims may refer to "an" element or "a first" element or equivalent. However, such claims should be understood to include incorporation of one or more elements, neither requiring nor excluding two or more such elements. Other variations or combinations of claims may be claimed through amendment of the present claims or through presentation of new claims in a related application. The subject matter of these claims should be regarded as being included within the subject matter of the present disclosure.

The invention claimed is:

1. A system for providing EGR to an engine, the system comprising:
   an internal combustion engine;
   a turbocharger comprising a compressor and a turbine;
   an EGR valve capable of directing exhaust gases from an engine's exhaust to a location in an engine's intake system upstream of the compressor or to a location in the engine's intake system downstream of the compressor; and
   a controller that provides torque compensation to the engine during an EGR valve state change from a condition solely supplying exhaust gases to downstream the compressor to solely supplying exhaust gases to upstream the compressor.

2. The system of claim 1, wherein torque compensation comprises adjusting a spark timing of the engine.

3. The system of claim 1, further comprising said controller providing torque compensation when a state of the EGR valve changes from a condition supplying exhaust gases to upstream the compressor to supplying exhaust gases to downstream the compressor.

4. The system of claim 1, wherein torque compensation comprises adjusting a position of the EGR valve to increase and then reduce a flow of EGR through the EGR valve during an EGR valve state change.

5. The system of claim 1, wherein torque compensation comprises adjusting engine valve timing.

6. The system of claim 1, wherein torque compensation comprises adjusting fuel timing to the engine.

7. The system of claim 1, wherein torque compensation comprises adjusting a turbocharger boost pressure.

8. The system of claim 1, wherein a three-way catalyst is installed in a duct between the engine's exhaust system and an upstream side of the compressor.

9. The system of claim 1, wherein a three-way catalyst is installed in an exhaust duct upstream of the EGR valve and upstream of the compressor.

10. A system for providing EGR to an internal combustion engine, the system comprising:
    an internal combustion engine having an exhaust duct and an intake duct;
    a turbocharger having a compressor and turbine, the turbocharger coupled to the internal combustion engine by way of the exhaust duct and the intake duct;
    an EGR valve configured such that an inlet of the EGR valve is in communication with the exhaust duct upstream of the turbocharger and such that a first outlet of the EGR valve is in communication with the intake duct downstream of the compressor, and such that a second outlet of the EGR valve is in communication with the intake duct upstream of the compressor; and
    a controller that adjusts a position of the EGR valve in response to a pressure differential.

11. The system of claim 10, wherein the pressure differential is a pressure difference between an intake manifold and an exhaust duct.

12. The system of claim 10, wherein the controller further adjusts engine valve timing in relation to the position of the EGR valve.

13. The system of claim 10, wherein the pressure differential is determined across an orifice.

14. The system of claim 10, wherein an efficiency of the turbocharger is adjusted when a state of the EGR valve switches from delivering exhaust gases to the intake duct upstream of the compressor to delivering exhaust gases to the intake duct downstream of the compressor.

15. The system of claim 10, wherein the position of the EGR valve is further adjusted in response to engine speed or load.

16. The system of claim 10, further comprising a catalyst located upstream of the inlet of the EGR valve or downstream of the second outlet of the EGR valve that is in communication with the intake duct upstream of the compressor.

17. An EGR delivery method, comprising:
adjusting a position of an EGR valve to a first position to deliver exhaust gases upstream of a compressor at a first pressure differential between an engine intake manifold and an engine exhaust duct; and
adjusting the position of the EGR valve to a second position to deliver exhaust gases downstream of the compressor at a second pressure differential between the engine intake manifold and the engine exhaust duct.

18. The EGR delivery method of claim 17, wherein a catalyst is positioned downstream of an outlet of the EGR valve and upstream of the compressor.

19. The EGR delivery method of claim 17, further comprising adjusting valve timing of an engine as the EGR valve switches from delivering exhaust gases upstream the compressor to delivering exhaust gases downstream the compressor.

20. The EGR delivery method of claim 17, further comprising adjusting engine spark advance as the EGR valve switches from delivering exhaust gases upstream the compressor to delivering exhaust gases downstream the compressor.

21. The EGR delivery method of claim 17, further comprising adjusting engine throttle position as the EGR valve switches from delivering exhaust gases upstream the compressor to delivering exhaust gases downstream the compressor.

22. An EGR delivery method, comprising:
adjusting a position of an EGR valve so that exhaust gas flows into an engine intake system to a first position upstream of a compressor during low engine speed and high engine torque; and
adjusting the position of the EGR valve so that exhaust gas flows into the engine intake system to a second position downstream of the compressor during high engine speed or when engine torque is low.

23. The EGR delivery method of claim 22, wherein the EGR valve is capable of directing exhaust gas to at least two paths.

24. The EGR delivery method of claim 22, wherein the position of the EGR valve is adjusted in response to engine speed.

25. The EGR delivery method of claim 22, wherein the position of the EGR valve is adjusted in response to engine torque demand.

26. The EGR delivery method of claim 22, wherein the EGR valve is electrically controlled.

* * * * *